United States Patent
Albrecht

(10) Patent No.: US 7,788,021 B2
(45) Date of Patent: Aug. 31, 2010

(54) DEVICE AND METHOD FOR CONTROLLING AN INTERNAL COMBUSTION ENGINE OF A MOTOR VEHICLE

(75) Inventor: Marc Albrecht, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/541,462

(22) Filed: Aug. 14, 2009

(65) Prior Publication Data
US 2010/0012085 A1    Jan. 21, 2010

Related U.S. Application Data

(63) Continuation of application No. PCT/EP2008/001800, filed on Mar. 6, 2008.

(30) Foreign Application Priority Data
Mar. 10, 2007 (DE) .......................... 10 2007 011 737

(51) Int. Cl.
G06F 19/00 (2006.01)
F02D 1/00 (2006.01)

(52) U.S. Cl. .................... 701/110; 123/319; 123/330

(58) Field of Classification Search .................. 701/101, 701/103, 110, 112, 114, 115; 123/478, 480, 123/319, 330, 339.1
See application file for complete search history.

(56) References Cited

U.S. PATENT DOCUMENTS

| | | | |
|---|---|---|---|
| 4,638,781 A | 1/1987 | Shiki et al. | |
| 5,048,482 A | 9/1991 | Kratt et al. | |
| 5,065,705 A | 11/1991 | Fujimoto et al. | |
| 5,847,644 A * | 12/1998 | Weisman et al. | ............. 340/439 |
| 6,363,910 B1 | 4/2002 | Kreischer et al. | |
| 6,944,532 B2 * | 9/2005 | Bellinger | ..................... 701/115 |
| 2003/0216847 A1 * | 11/2003 | Bellinger | ..................... 701/51 |
| 2004/0255903 A1 | 12/2004 | Esteghlal | |

FOREIGN PATENT DOCUMENTS

| | | |
|---|---|---|
| DE | 33 19 025 A1 | 11/1984 |
| DE | 35 31 868 A1 | 3/1986 |
| DE | 38 28 850 A1 | 3/1990 |
| DE | 40 22 359 A1 | 1/1991 |
| DE | 199 26 351 A1 | 10/2000 |
| DE | 101 41 600 A1 | 3/2003 |
| EP | 0 562 511 A1 | 9/1993 |
| WO | WO 99/64265 A1 | 12/1999 |

OTHER PUBLICATIONS

International Search report dated Jul. 23, 2008 with English translation (four (4) pages).

* cited by examiner

Primary Examiner—John T Kwon
(74) Attorney, Agent, or Firm—Crowell & Moring LLP

(57) ABSTRACT

A device for controlling an internal combustion engine of a motor vehicle, including a control unit for monitoring and limiting the rotational speed of the internal combustion engine that are designed in such a manner that after a predetermined first speed threshold an integral formation of the current present values over time occurs, and that, on reaching a predetermined integral limit value, the rotational speed is automatically limited.

20 Claims, 1 Drawing Sheet

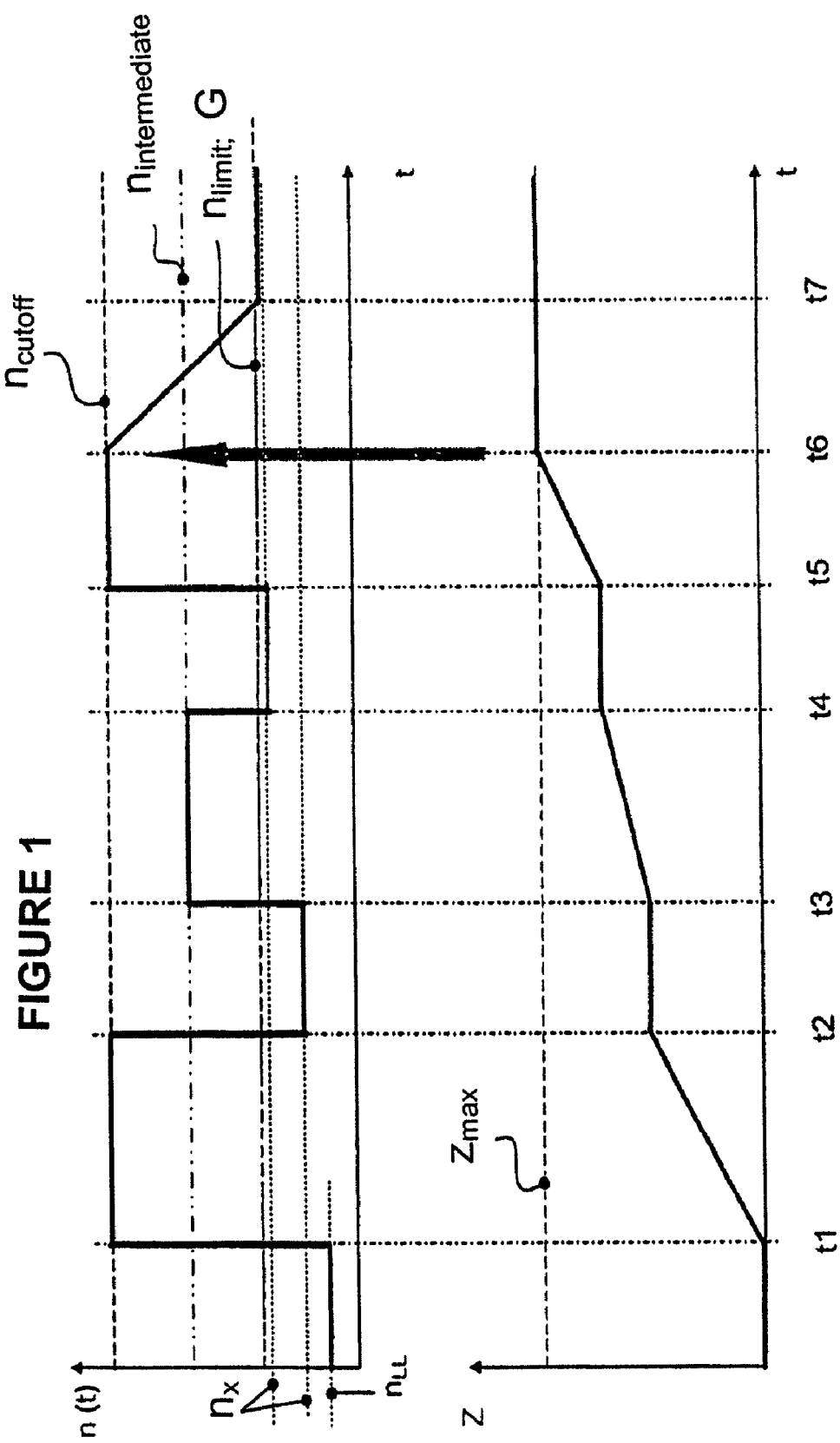

DEVICE AND METHOD FOR CONTROLLING AN INTERNAL COMBUSTION ENGINE OF A MOTOR VEHICLE

CROSS-REFERENCE TO RELATED APPLICATIONS

This application is a continuation of PCT International Application No. PCT/EP2008/001800, filed Mar. 6, 2008, which claims priority under 35 U.S.C. §119 to German Patent Application No. DE 10 2007 011 731.1, filed Mar. 10, 2007, the entire disclosures of which are herein expressly incorporated by reference.

BACKGROUND AND SUMMARY OF THE INVENTION

The invention relates to a device and a method for controlling an internal combustion engine of a motor vehicle. The inventive device and the inventive method make it possible to limit and/or regulate the rotational speed of the internal combustion engine in specific operating situations. The targeted speed reduction shall make it possible to implement preventive measures especially in operating situations that would mean an excessive thermal load on the internal combustion engine.

A variety of devices and methods already exist for the purpose of offering thermal protection to the internal combustion engine.

For example, today's vehicles have temperature indicating devices for the motor oil temperature or the cooling water temperature. In the event of critical motor oil or cooling water temperatures these temperature indicating devices allow the driver to take suitable countermeasures—for example, to stop the motor vehicle or optionally to bring the motor vehicle immediately to the automotive service center. Moreover, there exist active measures to counteract a thermal overheating to the effect that especially during stationary phases when the internal combustion engine is activated, the electrical fan units are automatically activated. However, these measures are insufficient to allow the internal combustion engine to run continuously during the stationary phase of the vehicle and/or at low vehicle speeds, when the rotational speed of the internal combustion engine exceeds the idle speed.

Such indicating and warning devices as well as active fan unit related measures known from the prior art have the drawback that they do not prevent a thermal overheating of the internal combustion engine due to misuse or the like.

Furthermore, German patent document DE 35 31 868 A1 discloses a fuel cut-off device that is intended for an internal combustion engine having a fuel supply means and that is supposed to protect the engine from excessive high speeds. This object is achieved in that the rotational speed of the internal combustion engine is constantly monitored, and on reaching a predetermined limit speed in a very high speed range, the fuel supply is cut off. Moreover, a distinction is made as to whether the internal combustion engine is operated in a loaded or non-loaded state. In the presence of a non-loaded operating state the predetermined limit value, at which a cut-off of the fuel supply is supposed to take place, is progressively reduced.

German patent document DE 33 19 025 A1 discloses a method and a device for limiting the rotational speed of an internal combustion engine. On reaching a maximum allowable limit speed, the ignition point is adjusted for the purpose of quickly limiting the rotational speed, and at the same time measures to act on the formation of the mixture are taken in order to prevent in this way the internal combustion engine from overheating as a result. Furthermore, it is proposed that the fuel supply be cut off as soon as a second higher speed limit is reached.

The object of the invention is to provide a device and a method for controlling an internal combustion engine so that the avoidance of the thermal overload on the internal combustion engine is improved even more. In particular, situations of misuse, in which a thermal overload of the internal combustion engine shall be and/or is induced, shall also be effectively counteracted.

The invention is based on the recognition that the above described devices and methods that are known from the prior art allow relatively high speeds for a prolonged period of time without providing any suitable countermeasures for a counteraction. In all cases rotational speeds just below the high limit speeds (cut-off speed) are allowed for a prolonged period of time. Therefore, in cases of continuous speeds just below the cut-off speed, thermal damage to the internal combustion engine can occur, if the excessive high speeds are present merely long enough.

The invention achieves this and other objects by exemplary embodiments of the present invention.

The device, according to the invention, comprises a control unit for monitoring and limiting the rotational speed of internal combustion engines that are designed in such a manner that after a predetermined first speed threshold an integral formation of the present speed values over time (and/or a summation of values that correlates thereto) occurs. On reaching a predetermined integral limit value, the rotational speed is automatically limited, according to the invention, to a predetermined reduced speed limit value. The predetermined first speed threshold is dimensioned in such a way that it is significantly above the idle speed and significantly below the cut-off speed (the cut-off and/or shut-off speed is (are) the maximum allowable speed, at which the engine is shut off and/or regulated for protection against mechanical damage—normally it is done by intervening in the ignition and/or the fuel supply process) of the internal combustion engine. The speed value, to which the rotational speed is limited as soon as the predetermined integral limit value is reached, is chosen in such a way that (assuming average general conditions for the outside temperature and the like) a continuous operation of the internal combustion engine without thermal damage to the internal combustion engine is possible. The speed value can be identical to the predetermined first speed threshold, but it can also be different. In particular, it can be dimensioned smaller than said first speed threshold.

The predetermined monitored speed threshold is designed advantageously so as to be variable and, therefore, can be set optimally to a variety of general conditions. In particular, (in the event that the rotational speed shall be monitored during the trip) the speed threshold is designed so as to be variable as a function of the vehicle speed and/or the engaged gear stage.

In an additional embodiment, the predetermined speed threshold is monitored exclusively in the operating mode "vehicle in the stationary mode." Vehicle in the stationary mode is defined for the purpose of the invention as an operating mode, in which a predetermined vehicle speed is close to or equal to zero km/h (for example, v</=1 km/h) and in which the force closure between the internal combustion engine and the drive wheels is interrupted (for example, activated coupling or idle gear stage engaged). Whether the vehicle is currently stationary may be determined by a monitoring unit that monitors the state of the vehicle.

In an especially preferred embodiment, the speed range above the monitored speed threshold is divided into different speed ranges (the different speed ranges being assigned different weightings and/or weighting factors [and/or integrating rates and/or counting rates]) in such a manner that higher speeds result in a steeper rise in the integral value than lower speeds. In this way the varying load on the internal combustion engine at different speeds above the monitored speed threshold is taken into consideration.

The invention proposes, analogous to the described device, an inventive method that monitors the rotational speed of the internal combustion engine in relation to a predetermined first speed threshold in that for the period of time, during which the first speed threshold is exceeded, an integral formation of the present speed values over time is carried out, and on reaching a predetermined integral limit value, the rotational speed is automatically limited to a predetermined reduced speed limit value.

If the integral limit value is reached, then the rotational speed is regulated in a ramp manner to the reduced speed limit value by reducing the rotational speed in a linearly falling manner to the predetermined value over a predetermined period of time. The predetermined period of time is varied advantageously as a function of the predetermined operating parameters, for example, as a function of the value of the actual rotational speed that is on hand at the period of time, during which the predetermined integral limit value is reached.

Furthermore, a driver, sitting in the vehicle, is informed about the state of the integral value (and, thus, also about the thermal state of the internal combustion engine) by means of a warning signal that is generated no later than upon reaching the predetermined integral limit value. As an alternative, on reaching an integral value below the predetermined integral limit value, an early warning signal, perceivable to the driver, can already be generated. This warning can ensue, for example, by activating a warning light in the instrument panel unit, and/or a corresponding acoustic and/or haptic warning signal can be emitted.

A further development of the invention can reduce specifically the integral (and/or the incrementally growing counter value) which increases incrementally through the addition of the speed values (and/or activation of a counter) for the time segments, during which the internal combustion engine is operated above the monitored speed limit, in the presence of specific operating conditions, which reduce the input of heat and/or energy that is introduced by the internal combustion engine. As the operating conditions that reduce the thermal input, the following factors are evaluated, in particular:

the cooling, resulting from the air stream while the vehicle is travelling, on exceeding a predetermined minimum speed (for example, by monitoring the vehicle speed v, for example, v>/=50 km/h); and/or the duration of time, during which the internal combustion engine is shut off (deactivated), and/or the temperature of the internal combustion engine.

Other operating conditions for decrementing the integral value are provided in an advantageous manner. In particular, for availability reasons the terminal and/or signal changeover is monitored by switching off and on again the internal combustion engine (monitoring the signal state at so-called "terminal 15"), and, as a function thereof, a predetermined reduction of the integral value is initiated. This strategy has the advantage that in the event that the integral limit value was reached, the integral limit value is reduced by a predetermined amount by simply switching off and on again the ignition. Moreover, for the next operating phase of the vehicle the driver is not restricted to the reduced speed limit value, but rather can use the vehicle (at least until the integral limit value is reached again) in the conventional manner, using the normal speed range.

One embodiment of the invention is illustrated in the drawing and is described in detail below.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a chart, which depicts the rotational speed of the internal combustion engine over time; and FIG. 2 is a chart, which matches the chart in FIG. 1 and which depicts the integral formation as a function of the current rotational speed of the internal combustion engine.

DETAILED DESCRIPTION OF THE DRAWINGS

The two charts show the inventive principle of incrementing a counter Z as a function of the rotational speed of the internal combustion engine n(t) and the principle of limiting, as a function of the incrementation, the rotational speed of the internal combustion engine to a reduced speed limit value G as soon as a predetermined maximum allowable counter value $Z_{max}$ (also referred to below as the integral limit value) is reached.

Working on the basis of an operating speed n having a momentary speed value equal to the idle speed $n_{LL}$, FIG. 1 shows that at time t1 the speed rises suddenly as far as up to the maximum allowable cut-off speed $n_{cutoff}$. At the same time the integral formation of the speed values and/or a counter Z is started at time t1 as soon as the predetermined first speed threshold $n_{limit}$ is exceeded. For the period of time, during which the predetermined and monitored speed threshold $n_{limit}$ is exceeded, the counter Z increments at a predetermined counter rate. Therefore, in the illustrated example the counter Z increments linearly with a predetermined slope (speed) until time t2, at which the current speed n falls below the predetermined speed threshold $n_{limit}$.

Different speeds n above the speed threshold $n_{limit}$ are assigned in an advantageous manner different counting rates (slopes), so that for the duration of time between t1 and t2, during which the internal combustion engine is operated at the maximum allowable rotational speed at the upper speed limit $n_{cutoff}$, the counter Z increments at a predetermined counting rate (assigned to the maximum speed). Starting from t2 up to time t3, the speed n assumes an intermediate speed value $n_x$ below the monitored speed threshold $n_{limit}$, so that up to time t3, at which the monitored speed threshold $n_{limit}$ is exceeded again, the counter suspends the counting process. At time t3 the counter is started again because the speed threshold $n_{limit}$ has been exceeded. Working on the basis of the counter count that is stored and was reached the last time that the monitored speed threshold was undershot, and as a function of the amount of the currently present speed n, the counter Z continues to increment as long as the speed threshold $n_{limit}$ is exceeded. Since in the time range between t3 and t4 the internal combustion engine is operated at a speed $n_{intermediate}$ above the monitored speed threshold $n_{limit}$ and (significantly) below the maximum speed $n_{cutoff}$, the counter Z continues to increment at a counting rate, which is assigned to this speed range and (which is less than the counting rate, assigned to the maximum speed). For the next subsequent period of time, the monitored speed threshold $n_{limit}$ is undershot (with an intermediate speed $n_x$) up to time t5, so that the counter Z pauses again (and/or suspends the counting operation).

At time t5 the monitored speed threshold $n_{limit}$ is exceeded again, so that the counter Z continues to increment. Since after time t5 the internal combustion engine is operated again at the maximum allowable speed, the counter Z increments again at the maximum counting rate, assigned to the maximum speed. At time t6 the internal combustion engine continues to be operated at the maximum speed $n_{cutoff}$. However, simultaneously at this point in time the predetermined (maximum allowable) integral limit value and/or the maximum allowable counter value $Z_{max}$ is also reached, so that an automatic process to limit the rotational speed of the internal combustion engine is initiated. In the embodiment, as soon as the maximum allowable integral limit value $Z_{max}$ is reached, the rotational speed n is decreased, as a function of a ramp function, to the predetermined speed limit value G that was reached at time t7. The predetermined speed limit value, to which the speed is regulated on reaching the integral limit value $Z_{max}$, can be (as illustrated) equal to the monitored speed threshold $n_{limit}$. However, it can also be different—in particular, it can be a lower value than that of the speed threshold $n_{limit}$.

In the above described embodiment the integration and/or counting process for forming the integral value is suspended in all cases, in which the speed threshold $n_{limit}$ that is to be monitored is undershot. As an alternative, it is also conceivable to implement a decrementing process of the integral value during this period of time. Such a procedure appears to be especially suited for internal combustion engines of larger construction with lower engine output power and relatively low heat inputs, because they also cool off faster again owing to the larger exterior surface areas (and/or a more efficient air cooling process).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for controlling an internal combustion engine of a motor vehicle, comprising:
   a control unit that monitors and limits the rotational speed of the internal combustion engine, wherein
   after a predetermined first speed threshold of the rotational speed is exceeded, an integral formation of values, correlating to rotational speed values of the internal combustion engine, occurs for the duration of time during which the speed threshold is exceeded, and
   when the integral formation of values reaches a predetermined integral limit value, the rotational speed is automatically limited to a predetermined speed limit value.

2. Device, as claimed in claim 1, wherein the speed threshold is dimensioned in terms of amount so as to be greater than the idle speed of the internal combustion engine.

3. Device, as claimed in claim 2, wherein the speed threshold is dimensioned in terms of amount so as to be less than the cut-off speed of the internal combustion engine.

4. Device, as claimed in claim 2, wherein the speed threshold is dimensioned so as to be variable.

5. Device, as claimed in claim 2, further comprising:
   a monitoring unit that monitors the state of the vehicle to determine whether the vehicle is currently stationary,
   wherein the rotational speed is monitored by the control unit only during the stationary phase of the vehicle.

6. Device, as claimed in claim 1, wherein the speed threshold is dimensioned in terms of amount so as to be less than the cut-off speed of the internal combustion engine.

7. Device, as claimed in claim 1, wherein the speed threshold is dimensioned so as to be variable.

8. Device, as claimed in claim 7, wherein the speed threshold is variable as a function of at least one of the vehicle speed and the gear stage.

9. Device, as claimed in claim 1, further comprising:
   a monitoring unit that monitors the state of the vehicle to determine whether the vehicle is currently stationary,
   wherein the rotational speed is monitored by the control unit only during the stationary phase of the vehicle.

10. Device, as claimed in claim 1, wherein different speed ranges above the speed threshold are weighted differently, in such a manner that higher speeds result in a steeper rise in the integral value than lower speeds.

11. Method for controlling an internal combustion engine of a motor vehicle, comprising the acts of:
    monitoring the rotational speed of the internal combustion engine in relation to a predetermined first speed threshold, wherein
    after the speed threshold is exceeded, an integral formation of values, correlating to rotational speed values of the internal combustion engine, occurs for the duration of time during which the speed threshold is exceeded; and
    limiting the rotational speed to a predetermined speed limit value in such a manner that on reaching a predetermined integral limit value, the rotational speed is automatically limited to the predetermined speed limit value.

12. Method, as claimed in claim 11, wherein the predetermined speed limit value is approached in the form of a ramp within a predetermined, variable period of time.

13. Method, as claimed in claim 12, wherein on reaching or exceeding a predetermined integral value that is less than the predetermined integral limit value, a warning signal is outputted to the driver.

14. Method, as claimed in claim 12, wherein the current integral value is decremented by a first predetermined value, when a signal change-over of the ignition ON/OFF signal is detected.

15. Method, as claimed in claim 11, wherein on reaching or exceeding a predetermined integral value that is less than the predetermined integral limit value, a warning signal is outputted to the driver.

16. Method, as claimed in claim 11, wherein the current integral value is decremented by a first predetermined value, when a signal change-over of the ignition ON/OFF signal is detected.

17. Method, as claimed in claim 11, wherein the current integral value is decremented by a second predetermined value, as a function of an operating parameter that correlates to the temperature of the internal combustion engine.

18. Method, as claimed in claim 11, wherein the current integral value is decremented by a third predetermined value, when the overshooting of a predetermined vehicle speed is detected.

19. Method, as claimed in claim 11, wherein the monitored speed threshold is varied as a function of at least one of the engaged gear stage and the vehicle speed.

20. Method, as claimed in claim 11, wherein the method is carried out only in the presence of a vehicle in the stationary phase with an interrupted force closure between the internal combustion engine and the drive wheels.

* * * * *